United States Patent [19]

Davis et al.

[11] Patent Number: 4,714,629

[45] Date of Patent: Dec. 22, 1987

[54] METHOD FOR TREATING AGGREGATE MATERIALS WITH WAX AND COMPOSITIONS THEREOF WITH BITUMEN FOR ROAD SURFACES

[75] Inventors: Benjamin L. Davis; Joseph M. Dixon, both of Essex; Nicholas D. Page, Kent, all of England

[73] Assignee: Mobil Oil Corporation, New York, N.Y.

[21] Appl. No.: 854,972

[22] Filed: Apr. 23, 1986

[51] Int. Cl.$^4$ .................... E01C 7/22; B05D 7/00
[52] U.S. Cl. ........................... 427/138; 106/36; 106/273 R; 106/276; 427/136; 427/214; 427/220; 427/221; 427/355
[58] Field of Search ........... 427/220, 221, 214, 138, 427/139, 136, 353; 106/36, 273 R, 276

[56] References Cited

U.S. PATENT DOCUMENTS

| | | | |
|---|---|---|---|
| 1,343,680 | 6/1920 | Pine | 427/221 |
| 1,972,390 | 9/1934 | Miner | 427/221 |
| 2,192,284 | 3/1940 | Dahlberg | 427/138 |
| 2,298,872 | 1/1941 | Pullar | 427/138 |
| 2,314,111 | 3/1943 | Tucker | 427/221 |
| 2,498,862 | 2/1950 | Pettijean | 427/138 |
| 2,774,383 | 12/1956 | Kidd | 427/220 |
| 3,010,840 | 11/1961 | Goff et al. | 427/220 |
| 3,386,851 | 6/1968 | Harlan | 427/221 |
| 4,453,980 | 6/1984 | Ward | 427/138 |
| 4,520,073 | 5/1985 | Randolph et al. | 427/221 |
| 4,525,388 | 6/1985 | Render et al. | 427/221 |

Primary Examiner—Janyce A. Bell
Attorney, Agent, or Firm—Alexander J. McKillop; Michael G. Gilman; Edward J. Trojnar

[57] ABSTRACT

Stone chippings of the type used in the manufacture of road surfaces by hotmix and surface dressing techniques, are rendered water resistant, and less susceptible to binder adhesion failure, by treatment with wax, preferably with wax emulsion.

10 Claims, No Drawings

METHOD FOR TREATING AGGREGATE MATERIALS WITH WAX AND COMPOSITIONS THEREOF WITH BITUMEN FOR ROAD SURFACES

BACKGROUND OF THE INVENTION

Road surface dressing is a relatively inexpensive technique for sealing and retexturing a worn road surface in order to improve its skid resistance. The procedure involves spraying a thin film of binder, for example bitumen, tar bitumen, bitumen emulsion or foamed bitumen, onto the old road surface, immediately spreading stone chippings or other aggregate onto the bituminous film and rolling the chippings into the film. The chippings may be used in an uncoated form (known as "dry") or they may have been previously coated with bitumen ("precoats").

A principal cause of surface dressing failure and chipping loss, especially in wet weather, is poor adhesion between the chippings and the sprayed binder film. This may be the result of any of a number of factors. For example, "dry" chippings are in practice often saturated with water or may absorb water after being spread on the road. Also, such chippings often have a dust film adhering to them, which may be present even after the stones have been washed, as a consequence of abrasion during transportation and handling. One method of overcoming this problem is to precoat the chippings with bitumen. However, precoated chippings may stick together, thereby blocking the chipping applicator, and the bitumen coating can strip from the chipping in wet conditions, allowing water to penetrate the stone.

All of these factors contribute to adhesion failure and in very cold or freezing conditions, water absorbed by the chippings can expand causing the chippings to lift or fracture.

Similar problems of poor adhesion between stone chippings and binder can occur also in hotmix (bitumen macadams, asphalt concretes, rolled asphalts, etc.) in which the stone chippings and the bitumen binder material are first mixed together at an elevated temperature and then spread onto the road surface and compacted, and in foamed bitumen applications which require the presence of large quantities of water.

Various proposals have been made over the years for improving the adhesion between the chippings and the binder, including the chemical treatment of the surface of the chippings and the inclusion in the bituminous binder of adhesion-promoting agents, usually nitrogen derivatives such as fatty amines. These latter materials, however, suffer from the disadvantage that they are rarely heat stable and their performance therefore diminishes rapidly during storage of hot bitumen containing them. The present invention, however, now seeks to provide a method for physically treating stone chippings and other aggregate materials by a simple and inexpensive procedure which increases the adhesion between the chippings and the binder.

SUMMARY OF THE INVENTION

According to this invention stone chippings or other aggregate material are treated with wax to coat the surface of the chippings or aggregate at least partially with wax. In another aspect of the invention, the coated aggregate is mixed with bitumen to form a composition which is suitable for road surfaces.

DETAILED DESCRIPTION OF THE INVENTION

The stone chippings are suitably of the type conventionally used in the manufacture of road surfaces and for surface dressing existing road surfaces, that is to say, they preferably consist of granite, limestone or basalt. Alternatively, there may be used another aggregate material, such as gravel, crushed gravel, or slag. The chippings suitably have a size that is conventional for such purposes, that is to say, from 3 to 28 mm, preferably from 6 to 14 mm.

The wax with which the chippings are treated according to the invention can be applied from a wax melt, from an organic solution of the wax (although such a method has the disadvantage that it requires an expensive solvent recovery procedure) or, preferably, from an aqueous emulsion of the wax. In this latter case, the chippings can conveniently be dipped in the wax emulsion, for example by passage through a trough containing the emulsion, or sprayed with the wax emulsion, for example during the washing process that the chippings may receive.

The wax emulsion suitably has a wax content of from 1 to 40% by weight, preferably from 1 to 10% by weight, and will generally be prepared by dilution with water of a more concentrated emulsion, for example one containing up to 70% by weight, preferably from 40 to 60% by weight, of wax. Such wax emulsions are preferably based on petroleum waxes and especially on paraffin waxes, but may also be based on natural or synthetic waxes. Paraffin wax emulsions of this type are readily commercially available generally for use in sizing applications, for example the sizing of such products as wood chips used in the manufacture of particle board, and paper.

The wax emulsion itself may be anionic, cationic, nonionic or acid-stable, or any compatible blend of two or more such emulsions. The particular variety of emulsion used for treating the chippings may be immaterial, but may have to be selected for compatibility with local water used for dilution of the emulsion. However, cationic emulsions are preferred since they have the particular advantage that they are broken on contact with stone chippings by virtue of reaction with the negatively charged surface of the stone. Such a feature has the added advantage that the wax is deposited on the surface of the stone with very little entrained water, so that drying of the wax-treated chipping is a relatively rapid and straightforward procedure. Drying may be carried out, for example, by heating the treated chippings or preferably by merely allowing the water to evaporate. The emulsion can, of course, be broken by other means, for example by the addition of alum to an acid-stable emulsion, in order to deposit wax on the surface of the stone chippings. In general, however, the addition of emulsion-breaking materials will not be favored since the whole of the emulsion will then be broken and will be unsuitable for recovery and/or reuse.

In other cases where the wax emulsion is not broken, best results are achieved if the water is removed to leave the wax on the chipping. This may be achieved by heating the emulsion-coated chippings, for example in a drum drier, or again by allowing the water to evaporate.

The amount of wax applied to the stone chippings by the method of the invention may vary within wide limits and will depend to some extent upon the precise procedure by which the wax is applied. Preferably, however, the wax forms on the stone chippings a coating having a thickness of not more than 1 mm and preferably not more than 0.1 mm, and it should be understood that the coating may be considerably thinner and not necessarily continuous over the whole surface of each stone chipping. For example, when the wax is applied from an emulsion, the surface of the stone chippings may have deposited thereon a large number of individual wax particles derived from the emulsion. In this latter case, the amount of wax on the chippings should be more properly specified in terms of weight, and may comprise as little as 0.01% by weight or as much as 2% by weight or more of the stone chipping. Generally, however, amounts of 0.1 to 0.5% by weight have proved preferable, whereas substantially larger amounts, for example in excess of 1.5% by weight, may show a tendency to cause the treated chippings to adhere together.

In most cases, the visual appearance of the chippings will not change by virtue of the treatment according to the invention. However, in those cases where subsequent to treatment with the wax, the chipping is heated to a temperature above the melting point of the wax, the wax may enter the pores of the stone and this may result in the chippings assuming a darker-colored appearance than previously.

Stone chippings that have been wax treated according to the method of the invention are rendered water-repellent and consequently water ingress and subsequent adhesion failure when the chippings are used in road-making applications, are largely prevented. In addition, the wax on the surface of the chippings melts on contact with hot bitumen, lowering the viscosity at the area of contact between the chippings and the bitumen and thereby improving wetting of the chippings with the bitumen and consequently improving adhesion. Moreover, when using mixtures for preparing foamed bitumen which contain large quantities of water, it is desirable that excess water runs off as quickly as possible; the water-repellent properties of the chippings treated according to the invention considerably facilitate such water run off and therefore assist in curing of the foamed bitumen mix.

Furthermore, the wax imparts lubricity to the stone chippings, which helps to reduce the formation of dust by abrasion during drying/handling/transportation of the chippings and, in itself, greatly improves the chipping/bitumen adhesion. Also, the wax coating is resistant to the washing action of rain, enabling the treated chippings to be stored in the open air, and the wax coating may in some cases obviate the requirement for bitumen-coated chippings and thereby eliminate the problem of blockages in chipping applicators.

The following tests and field trial were carried out to illustrate the improvements in stone-bitumen adhesion that can be achieved by the method of the invention, and how those improvements can be realized in surface dressing.

I. Laboratory Tests

1. Materials 10 mm Mount Sorrell granite aggregate was used in the tests. This stone is well known in the United Kingdom for its poor adhesion to bitumen, and is used as a standard aggregate in the following tests. Other stones (gravels, limestones and basalts) have also been wax treated and tested, and the results (although not reported here) show similar trends and benefits.

Two adhesion agents were used to provide comparative data on the adhesion performance of wax coated stone versus bitumen containing adhesion agents. The two products chosen were Redicote N422 from Akzo Chemie, and Wetfix C from Thomas Swann Ltd. N422 had been shown in previous studies to be the best commercially available adhesion agent. Wetfix C is used for comparison purposes.

Two different bitumens were used. In the CPII active adhesion test described below, Foamspray 300 Pen was selected. The Foamspray binder is the most viscous bitumen likely to be used in surface dressing. Use of this binder unfoamed in the CPII test represents the most severe condition likely to be encountered. In the total water immersion test conventional Mobil 200 Pen grade was used.

Five different wax emulsions were studied, representing most of the various chemical types available—acid stable, cationic, cationic/non-ionic and anionic/non-ionic. It was expected that the cationics would perform best, since they should break electrostatically on the negatively charged stone surface. These wax emulsions, all manufactured by Mobil, are identified as Mobilcer A, Mobilcer 45, Mobilcer 46, Mobilcer 658 and Mobilcer 749.

2. Stone Treatment

Each wax emulsion selected for testing was diluted with water to provide 10% and 20% by weight solids content emulsions.

Sieves containing the Mount Sorrell aggregate were immersed in the emulsions, left for approximately ten seconds, removed and allowed to drain. The treated stones were left to dry at ambient temperature for 3-4 hours prior to testing. Clean, untreated stone was prepared by thorough washing to remove any surface dust followed by drying for 3 hours at 163° C. in an air oven. The clean, dry stones were left to cool overnight before testing.

Cold Placement Immediate Immersion (CPII) Test

Scope: This test represents what can occur when a thin film of binder is applied and the time interval until chipping application is large (slightly more severe than operational practice).

Method: 20 g of the prepared binder at 163° C. are poured onto a 125 mm diameter metal tray and dispersed to produce an even film, and the tray is then left to cool to ambient temperature for thirty minutes. Ten chippings are placed into the binder film. The tray is immediately immersed in a water bath at 25° C. (chippings should be clean, dry and of single size). After 10 minutes' immersion the tray is removed and each stone is inverted. The remaining quantity of binder on the base of the chipping is then assessed and noted.

3. (a) Passive Adhesion

Total Water Immersion Test

Scope: The test is designed to provide information on the resistance of the binder film to stripping.

Method: The aggregate to be tested is placed in an oven for four hours at 120° C. The hot stone is then removed, and fully and evenly coated with 3.5% bitumen, by hand mixing with a spatula and warming on a hot plate as necessary. The coated stone is placed in a glass jar, and allowed to cool for at least three hours. After cooling the coated stone is covered in distilled water, and the jar is sealed. The jar is then placed in a water bath at the test temperature (25° C. or 40° C.). The jar is removed at regular intervals, and the percentage of the stone surface that is coated is visually assessed and recorded.

3. (b) Soxhlet Extraction

The amount of wax deposited on the stone surface from the various types of emulsion at their different concentrations was determined by Soxhlet extraction using methyl ethyl ketone.

3. (c) Dusting

Samples of treated and untreated stones were rotated in a container to evaluate the quantity of dust generated by abrasion.

3. (d) Weathering

Samples of treated stones were left in the open air and subjected to the full force of the weather.

4. Results (a) Active Adhesion

CPII Test

Results were obtained using different wax emulsions at 5%, 10% and 20% by weight solids contents. The Foamspray bitumen used contained no adhesion agent. Clean, untreated chippings have virtually no adhesion to Foamspray in this test. All the wax emulsions tested improve the adhesion but best results (almost 100% adhesion) are obtained using the cationic types—Mobilcer 45, 46 and 658. The most cost effective treatment is the use of Mobilcer 45 at 5% dilution. Mobilcer 658 also performed well, and is more stable to hard water than Mobilcer 45 which might be important in certain locations. Comparisons were made to show the active adhesion obtained by using chippings treated with Mobilcer 45 at 5% by weight solids and the adhesion of clean chippings to:

1. Foamspray
2. Foamspray containing 0.5% by weight and 1% by weight of the best available adhesion agents (N422 and Wetfix C).
3. Foamspray plus adhesion agent that has been stored for 72 hours at 165° C.

The results show that:

1. far better active adhesion results are obtained using wax emulsion-treated chippings, than by adding even 1% by weight adhesion agent to the binder. Addition of levels above 1% by weight do not give significant improvements in adhesion, and would be uneconomic.
2. the adhesion performance of bitumen containing adhesion agent falls significantly after 72 hours hot storage at 163° C. Adhesion levels obtained are not much better than levels from bitumen with no additive.
3. wax coated chipping adhesion is almost unaffected by binder hot storage. The bitumen used did not contain adhesion agent, and the very slight fall in result can be attributed to the bitumen viscosity increase resulting from slight oxidative hardening on storage. The two results are within test repeatability.

The tests were repeated using wet chippings (treated and untreated) and the same trends were evident.

(b) Passive Adhesion

The passive adhesion of 200 Pen bitumen to clean chippings, and to chippings treated with various wax emulsions at 5%, 10% and 20% solids content were compared. All wax emulsions tested improve the passive adhesion of bitumen to stone. The performance of untreated stone falls significantly over the immersion period. At 25° C. the test does not discriminate between the various emulsion types used. At 40° C., however, it is clear that cationics perform best, at 10% solids. Results at 5% and 20% solids are also perfectly acceptable. Stone coated with 20% solids emulsion did tend to stick together, although this may be a consequence of the way the stones were dried.

The adhesion results were obtained using:

1. wax treated stone and Foamspray without added adhesion agent.
2. clean stone and Foamspray with and without adhesion agent.

Here the benefits of wax coating are less obvious, although the trends are still evident. The total water immersion test is a less severe test than the active adhesion CPII test.

(c) Soxhlet Extraction

The figures in the following Table show that a relatively small amount of wax is deposited on the stone surface, and that the cationic emulsions—45, 46 and 658—deposit more wax, as would be expected from electrostatic break considerations.

TABLE

| Emulsion | Solids Content, Wt. % | Wax on Stone, Wt. % |
|---|---|---|
| Mobilcer 46 | 5 | 0.35 |
|  | 10 | 0.50 |
|  | 20 | 1.14 |
| Mobilcer 45 | 5 | 0.28 |
|  | 10 | 0.61 |
|  | 20 | 1.48 |
| Mobilcer 658 | 5 | 0.24 |
|  | 10 | 0.6 |
|  | 20 | 1.44 |
| Mobilcer 749 | 5 | 0.22 |
|  | 10 | 0.30 |
|  | 20 | 0.82 |
| Mobilcer A | 5 | 0.16 |
|  | 10 | 0.29 |
|  | 20 | 0.77 |

(d) Dusting

As expected, wax-treated stone chippings resisted abrasion much better than untreated chippings. The untreated chippings generated more than five times as much dust in the most severe test, compared to the treated chippings.

(e) Weathering

The stones have been examined at regular intervals and still exhibit hydrophobic properties after 3 months' exposure to the weather. The wax coating remains effective and the stones are not wetted when dipped into water. Water remains as beads on the stone surface and is not absorbed into the stone by capillary action.

II. Field Test

Initial attempts to coat stone in a commercial rotary drum washer were not successful mainly because of the large amount of dust in the system and the degree of churning in the washer.

An immersion technique was therefore adopted in which a trough filled with 10 mm basalt aggregate was flooded with wax emulsion. After one minute the surplus emulsion was removed by pumping it back into the wax emulsion storage tank. The treated aggregate was transferred to a stock pile where it was allowed to drain. 10 tons of aggregate were treated in this way.

The treated basalt aggregated was used to surface dress a section of a rural secondary road in eastern England. At the same time, untreated basalt aggregate was applied to an adjacent section of the road as a control. The same tar/bitumen binder was used throughout the trial.

The test site has been monitored at monthly intervals. After one month the section using untreated stone was showing initial signs of dressing failure. Heavy loss of stone from the wheel tracks was noted.

Two months later, after the first severe frost of the winter, there was extensive loss of stone from the untreated section. A slight loss of stone was noted on the treated section.

After 4 months, the untreated section of the road has failed completely. The treated section was still satisfactory.

We claim:

1. A method for imparting hydrophobic properties to stone chippings and other aggregate materials suitable for use in road surfaces, which comprises treating the chippings or aggregate having a size of 3 to 28 mm with an aqueous wax emulsion to at least partially coat the surface of the chippings or aggregate with wax.

2. A method according to claim 1, wherein the stone chippings are of granite, limestone or basalt.

3. A method according to claim 1, wherein the wax is a paraffin wax.

4. A method according to claim 1, wherein the emulsion is a cationic emulsion.

5. A method according to claim 1, wherein the emulsion has a wax content from 1 to 10% by weight.

6. A method according to claim 1, wherein the emulsion is applied to the chipping by dipping or spraying.

7. A method according to claim 1, wherein the chipping having an at least partial coating of wax, is subsequently coated with bitumen.

8. A method for constructing a skid-resistant road surface by surface dressing, which comprises spraying a film of binder onto an existing road surface, spreading stone chippings onto the binder and rolling the chippings into the binder, wherein said stone chippings have been treated with an aqueous wax emulsion to coat their surfaces at least partially with wax.

9. A method for constructing a skid-resistant road surface, which comprises mixing together a bitumen binder and stone chippings at an elevated temperature, applying the mixture to a prepared base and spreading and compacting the mixture, wherein said stone chippings have been treated with an aqueous wax emulsion to coat their surfaces at least partially with wax.

10. A composition comprising wax coated aggregate and bitumen binder in which said aggregate has been treated with an aqueous wax emulsion to coat its surfaces at least partially with wax.

* * * * *